C. B. GILLESPIE.
CONTINUOUS FILM KINETOSCOPE.
APPLICATION FILED JULY 17, 1908.
921,537.
Patented May 11, 1909.
2 SHEETS—SHEET 1.
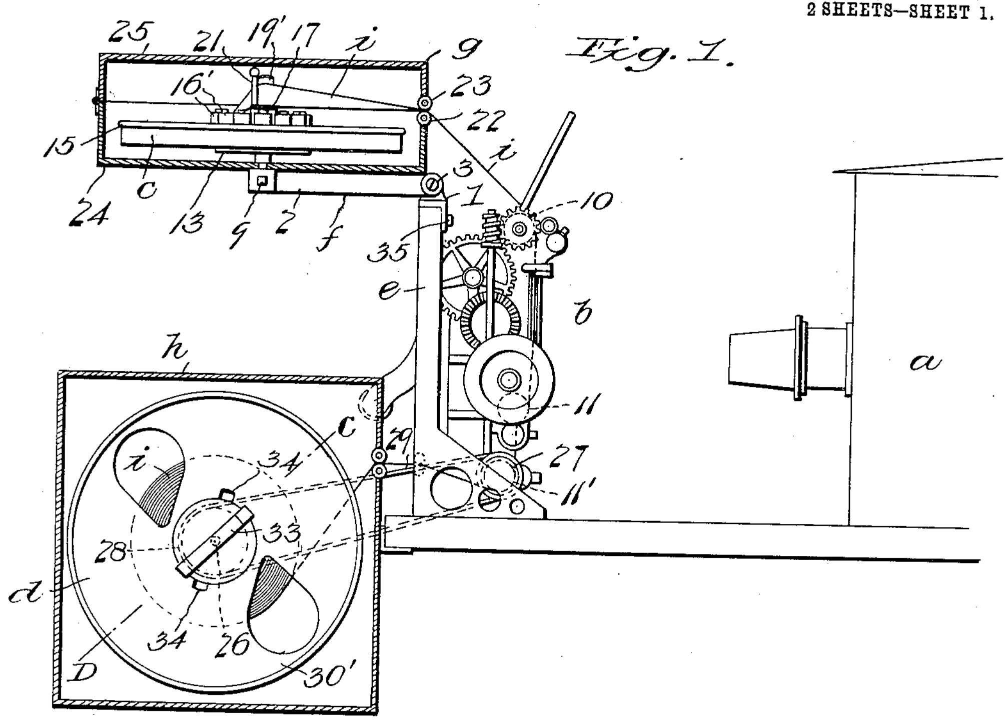
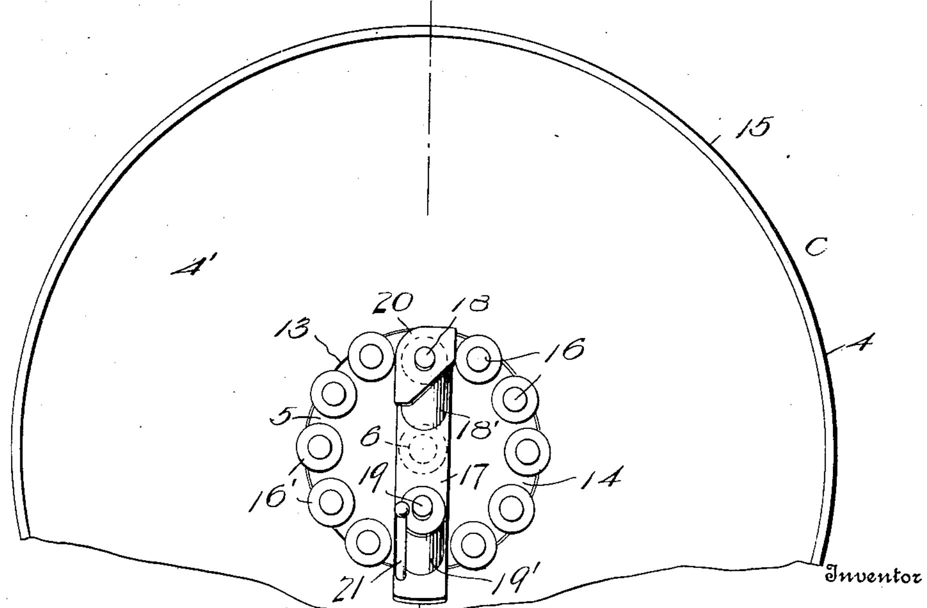
Witnesses
P. L. Mockabee
E. O. Crocker
Inventor
Charles B. Gillespie
By Jas. L. Lewis,
Attorney.

C. B. GILLESPIE.
CONTINUOUS FILM KINETOSCOPE.
APPLICATION FILED JULY 17, 1908.
921,537.
Patented May 11, 1909.
2 SHEETS—SHEET 2.
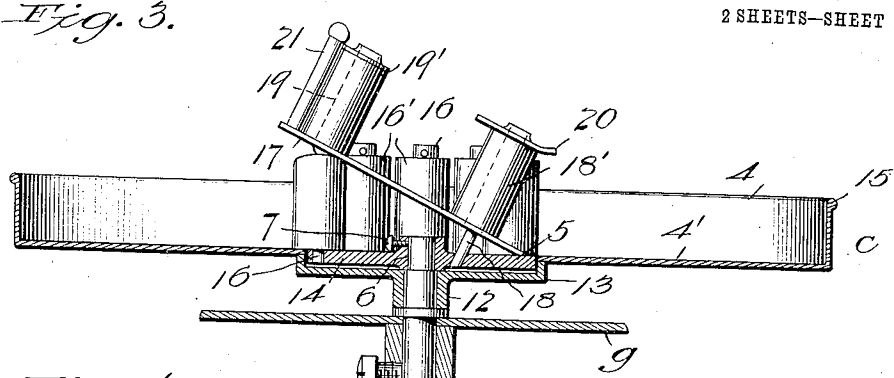
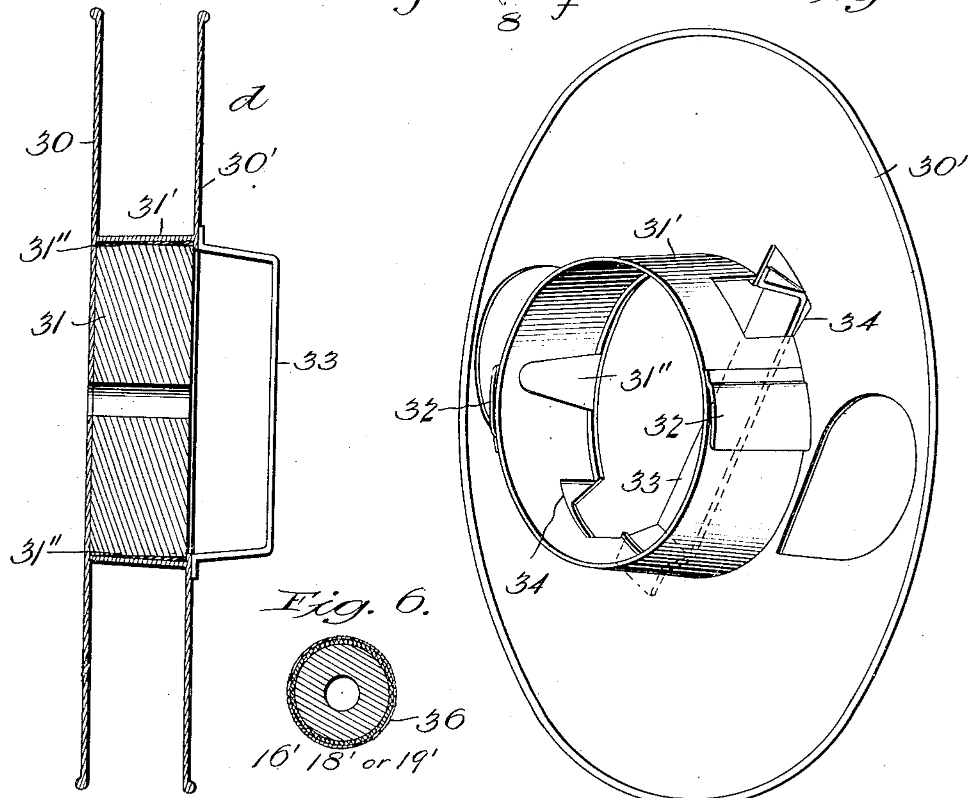
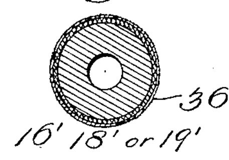
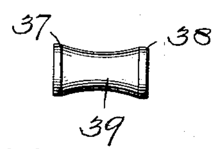
Inventor
Witnesses
Charles B. Gillespie
By
Attorney

UNITED STATES PATENT OFFICE.

CHARLES B. GILLESPIE, OF RIDGEVILLE CORNERS, OHIO.

CONTINUOUS-FILM KINETOSCOPE.

No. 921,537. Specification of Letters Patent. Patented May 11, 1909.

Application filed July 17, 1908. Serial No. 444,089.

*To all whom it may concern:*

Be it known that I, CHARLES B. GILLESPIE, a citizen of the United States of America, and a resident of Ridgeville Corners, Henry county, in the State of Ohio, have invented a new and useful Improvement in Continuous-Film Kinetoscopes, of which the following is a specification.

This invention relates to the feed and take-up reels of those kinetoscopes or moving-picture machines in which a continuous film is fed from one reel to another in the operation of the machine; and it relates more particularly to means by which the film may be drawn from the interior or middle convolution of the film-roll in the feed reel, and restored to the feed reel without rewinding.

The leading object of the present invention is to construct a simple and effective pair of reels with appurtenances adapted to operate on that principle, and which can be substituted for the ordinary reels of moving picture machines now in use, and manipulated by operatives of ordinary skill.

Another object is to so construct the improved reels that each of them, and especially the peculiar feed reel, may be inclosed in a fireproof "magazine", and protected by a suitable "trap" against destruction by fire in case of accident.

Other objects will be set forth in the general description which follows:

The invention consists in certain novel combinations of parts, and in a continuous-film kinetoscope or moving-picture machine embodying such combinations or any of them, as hereinafter described and claimed.

Two sheets of drawings accompany this specification as parts thereof.

Figure 1 is a side view partly in section representing the general combination of parts; Fig. 2 is a top view on a larger scale of the feed reel and its appurtenances; Fig. 3 represents a vertical section on the line A—B, Fig. 2; Fig. 4 represents a vertical section on the line C—D, Fig. 1, and on the same scale as Figs. 2 and 3, through the take-up reel in its winding condition; Fig. 5 is a perspective view of the transferring portion of the take-up reel detached and empty; Fig. 6 represents a cross section through one of the plush covered feed rolls hereinafter described; and Fig. 7 is a side view of a substitute feed roll illustrating a modification.

Like reference characters indicate like parts in all the figures.

Said general combination of parts, Fig. 1, includes a picture projecting lantern, *a*, and a feed mechanism, *b*, which may be of any known or improved forms to which the improved reels, *c* and *d*, are or may be applicable, including those of machines now in use; a frame, *e*, common to said lantern and feed mechanism, and which can be tilted to support said lantern and feed mechanism at any required angle; a feed-reel supporting bracket, *f*, having sections 1 and 2, connected with each other by a clamp hinge, 3, having a transverse horizontal axis, so as to provide for keeping the axis of the feed reel *c* vertical when said frame *e* is tilted; and magazines, *g* and *h*, inclosing the respective reels. Said feed reel *c* has a rotatable annular main portion, 4, adapted to turn as required under the tension and edge contact of the film, *i*, itself, and a non-rotary hub portion, 5, around which said main portion revolves. The hub portion 5 is supported upon the outer section 2 of said bracket *f*, and is preferably and conveniently provided for this purpose with a central socket, 6, and a clamp screw, 7, to interact with a vertical stem, *j*, interposed between said bracket *f* and the reel; the lower end of said stem being fixedly held in a socket, 8, in said bracket by a clamp screw, 9. This construction provides for adjusting said hub portion 5 of the reel with reference to the direction of film guiding means carried by said hub portion, so that the film *i* will be guided in a straight and direct line to the customary toothed feed rolls 10 11 and 11′ of the feed mechanism *b*. Said main portion 4 of the feed reel is constructed with a central bearing, 12, which interacts with said stem *j*, and with a circular depression, 13, in its horizontal floor surface, 4′, concentric with said bearing, within which the upper disk, 14, of said hub portion 5 fits flush, as shown in Fig. 3, but loose enough to offer no frictional resistance to the rotation of said main portion, which is intended to be entirely free and self-regulating in touch with the film *i*. Said main portion 4 is further constructed with a rim, 15, at its perimeter, giving the feed reel *c* the form of an open-topped pan; said rim surrounding the floor surface 4′ upon which the film roll rests within the feed reel, and operating to prevent the displacement of the outer coils of the film roll by centrifugal force. Said disk 14 of the hub portion 5 is provided with the spindles, 16, of a circular series of vertical rolls, 16′, adapted to contact with the interior of the film roll; and a superposed inclined support, 17, carries the spindles 18, 19, of a pair of delivery rolls, 18′ and 19′, which are thus supported at an oblique angle with reference to said vertical rolls 16′. An end guard, 20, is attached to the top of the spindle 18 of the lower roll, and a guard finger, 21, parallel with the upper roll 19′, is carried by the upper end of the support 17. Said vertical rolls 16′ maintain a substantially uniform diameter at the inner circumference of the film roll, and the film is therefore drawn from this circumference under substantially uniform strain whatever length of film may remain in the roll. With the aid of said end guard 20 and said guard finger 21, said delivery rolls 18′ and 19′ direct the film *i* away from the interior of the film roll and upward above the plane of the reel rim 15, and twist the film just enough to make it pass therefrom without torsional strain between a pair of horizontal rolls, 22 and 23, Fig. 1. Said horizontal rolls 22 and 23 are conveniently and preferably those of an automatic "trap", and in the improved machine are supported respectively within the body, 24, and within the lid, 25, of the feed-roll magazine, *g*, on the respective sides of the horizontal or substantially horizontal parting joint between said body 24 and lid 25, at the outlet of the magazine. Owing to this arrangement, the film *i* can be simply laid upon the lower roll 22 when the magazine is open, without the customary threading operation, and the upper roll 23 is pressed down upon the film when the lid 25 is closed. Otherwise the trap may be of known or improved construction.

The take-up reel *d* is of the peculiar construction best shown in Figs. 4 and 5, which see. This reel *d* is adapted to be substituted for the ordinary take-up reel upon a spindle, 26, driven through a pair of pulleys, 27 and 28, and a connecting band, 29, with their known appurtenances, from said feed mechanism, *b*. The reel, *d*, is composed of a pair of disks, 30, 30′, and a pair of hub portions, 31, 31′, of which said disk 30 and said hub portion 31 are united with each other and made fast on said spindle 26, and said disk 30′ and said hub portion 31′ are united with each other and constitute the main elements of a detachable portion of the reel, segregated by Fig. 5. Said hub portion 31′ is constructed with a pair of attaching lips, 32, by either of which the take-up end of the film is attached; and this hub portion, 31′, embraces the inner hub portion, 31, tightly enough to cause the detachable portion of the reel and therewith the film roll thereon to rotate with said inner hub portion and with said spindle 26. A handle, 33, attached externally to said disk 30′ provides for conveniently manipulating said detachable portion of the take-up reel to transfer the film roll from the latter to the feed reel *c*. A slight taper of said hub portion 31′ facilitates the escape of the film roll therefrom; internal contacts, 31″, steady said tapering hub portion 31′ on the cylindrical periphery of the inner hub portion 31; and a pair of thumb holes, 34, adjacent to the ends of said handle 33 in said disk 30′ and hub portion 31′ provide for ejecting the film roll, should it stick, by the pressure of the thumb of the hand grasping said handle 33, whichever end of the latter may be toward the thumb. After transferring a film roll, the take up end of the film is again attached to said hub 31′ by one of its lips 32; the detachable portion is then replaced to complete the take-up reel *d*, and the magazine *h* of this reel is again closed. This magazine, *h*, may be wholly of known construction, and therefore requires no description.

The inner section, 1, of the bracket *f* is flanged and notched for attachment to an upright portion of said frame *e* by a pair of clamp bolts, 35, Fig. 1, such as have heretofore been employed for attaching the bracket of a different feed reel.

The contact rolls 16′, 18′ and 19′ within the feed reel *c* are preferably in common made of wood with a covering, 36, Fig. 6, of soft plush or velvet. Instead they may be made of metal with rings, 37 and 38, Fig. 7, at their respective ends, to contact with the perforated edges of the film, and a contracted waist portion, 39, to clear the figured portion of the film. The number of these rolls may obviously be increased or diminished at will; one each of the attaching lips 32 and thumb holes 34 of the take-up reel *d* may be omitted; and other like modifications will suggest themselves to those skilled in the art.

Having thus described said improvement, I claim as my invention, and desire to patent under this specification:

1. The combination with the lantern and feed mechanism of a continuous-film kinetoscope and a frame common thereto, of a feed reel having a vertical axis, means for guiding the film from the interior of a film roll supported by said reel, and adjustable means for supporting the axis of said feed reel, said supporting means being adjustable on a transverse horizontal axis for keeping said axis of the feed reel vertical when said frame is tilted.

2. The combination with the lantern and feed mechanism of a continuous-film kinetoscope of a feed reel having a vertical axis and inclosed within a magazine having a substantially horizontal parting joint between its body and its lid, and a pair of trap rolls located respectively within said body and within said lid on the respective sides of said joint, the upper roll being movable with said lid to obviate threading the film between said rolls.

3. In a continuous-film kinetoscope a feed reel having a vertical axis and a horizontal floor, and comprising a rotatable annular main portion adapted to turn as required under the tension and edge contact of the film itself and a non-rotary hub portion provided with means for guiding the film from the interior of the film roll or its middle convolution.

4. In a continuous-film kinetoscope, a feed reel having a vertical axis and a horizontal floor, and comprising a rotatable annular main portion and a non-rotary hub portion, the latter provided with a circular series of vertical rolls adapted to contact with the interior of the film roll and to determine its internal circumference, a pair of delivery rolls supported parallel with each other at an oblique angle with reference to said vertical rolls, a guard supported at the top of the lower delivery roll and a guard finger parallel with the upper delivery roll.

5. In a continuous film kinetoscope, a feed reel in the form of an open-topped pan having a vertical axis, a horizontal floor and a circumferential rim, and composed of a rotatable annular main portion and a non-rotary hub portion, the latter provided with means for determining the inner circumference of the film roll and for delivering the film from the interior of the film roll.

6. In combination with a feed reel having a vertical axis and a horizontal floor and provided with means for delivering a continuous film from the interior of a film roll therein, a spool-shaped take-up reel having a horizontal axis and constructed with a detachable portion comprising one disk of the reel and a hub portion united therewith, said detachable portion being adapted to transfer the film roll from the take-up reel to the feed reel without rewinding.

7. In a continuous-film kinetoscope, a spool-shaped take-up reel having a horizontal axis and constructed with a detachable transferring portion comprising one disk of the reel and a hub portion united therewith, said detachable portion being provided with a handle attached to the outer side of its disk and a thumb hole adjacent to such handle to facilitate pushing the film roll off its hub.

8. In combination with a take-up reel having a horizontal axis, a feed reel having a vertical axis and a horizontal floor and provided with means for determining the inner circumference of a film roll therein and for delivering the film from the interior of such film roll, said means including rolls having peripheral surfaces to contact with the film formed by roll coverings of soft plush, substantially as hereinbefore specified.

CHARLES B. GILLESPIE.

Witnesses:

JAS. L. EWIN,

M. H. YATES.